(12) United States Patent
Shefet

(10) Patent No.: US 7,195,551 B2
(45) Date of Patent: Mar. 27, 2007

(54) CASINGLESS FOOD PRODUCTION METHODS, SYSTEMS, AND ASSOCIATED WRAPPABLE COVERINGS

(75) Inventor: Sarid M. Shefet, Cary, NC (US)

(73) Assignee: ConAgra Foods, Inc., Edina, MN (US)

( * ) Notice: Subject to any disclaimer, the term of this patent is extended or adjusted under 35 U.S.C. 154(b) by 446 days.

(21) Appl. No.: 10/232,139

(22) Filed: Aug. 30, 2002

(65) Prior Publication Data

US 2004/0043717 A1   Mar. 4, 2004

(51) Int. Cl.
*A01K 11/00* (2006.01)

(52) U.S. Cl. .................. 452/32; 426/513; 99/353; 99/384; 99/441

(58) Field of Classification Search ............... 452/21, 452/22, 30–32, 35–38, 46–48, 51; 426/513, 426/516, 517, 241, 118; 99/349, 352, 353, 99/356, 360, 361, 362, 426, 427, 428, 441, 99/450.6, 494, 355, 384, 513

See application file for complete search history.

(56) References Cited

U.S. PATENT DOCUMENTS

| | | | | |
|---|---|---|---|---|
| 3,857,330 A | * | 12/1974 | Ruckstaetter | 99/354 |
| 4,079,666 A | | 3/1978 | Plemons et al. | 99/355 |
| 4,565,282 A | | 1/1986 | Olsson et al. | 198/778 |
| 4,582,047 A | | 4/1986 | Williams | 126/369 |
| 4,709,447 A | * | 12/1987 | Townsend et al. | 452/37 |
| 4,727,625 A | * | 3/1988 | Townsend et al. | 452/32 |
| 4,766,645 A | | 8/1988 | Lamartino et al. | 17/49 |
| 4,997,365 A | | 3/1991 | Lanham | 432/121 |
| 5,049,108 A | | 9/1991 | Staudenrausch | 452/48 |
| 5,078,120 A | | 1/1992 | Hwang | 126/21 A |
| 5,147,239 A | * | 9/1992 | Staudenrausch | 452/47 |

(Continued)

FOREIGN PATENT DOCUMENTS

FR   2.088.622   4/1970

OTHER PUBLICATIONS

Article, "Continuous Process Systems", Alkar, http://www.alkar.com (date unavailable; believed to be dated before Mar. 1, 2002) pp. 1-3.

(Continued)

*Primary Examiner*—Thomas Price
(74) *Attorney, Agent, or Firm*—Myers Bigel Sibley & Sajovec PA

(57) ABSTRACT

Systems, methods, and associated devices for casingless production of food products include: (a) moving at least one flexible cover member having a predetermined length with primary surface and opposing lateral edge portions along a predetermined travel path; (b) introducing a flowable food emulsion onto the primary surface of the flexible cover member; (c) wrapping the at least one flexible cover member about the food emulsion during the moving step; (d) advancing the wrapped emulsion into at least one forming tube having sufficient structural rigidity to be substantially non-deformable and having a preformed internal cavity space of predetermined size and shape; and (e) exposing the wrapped emulsion to predetermined processing conditions that convert the flowable emulsion to a non-flowable food product having substantially the molded shape of the forming tube as the wrapped emulsion advances through the at least one forming tube.

29 Claims, 9 Drawing Sheets

U.S. PATENT DOCUMENTS

| | | | |
|---|---|---|---|
| 5,277,301 A | 1/1994 | Fenty | 198/778 |
| 5,480,346 A | 1/1996 | Kasai et al. | 452/47 |
| RE35,259 E | 6/1996 | Williams | 126/369 |
| 5,788,563 A | 8/1998 | Nakamura et al. | 452/47 |
| 5,942,265 A | 8/1999 | Roberds et al. | 426/59 |
| 6,045,848 A | 4/2000 | Quinones et al. | |
| 6,279,646 B1 | 8/2001 | Ross et al. | 164/507 |
| 6,322,832 B1 | 11/2001 | Schiffmann | |
| 6,326,039 B1 | 12/2001 | Schiffmann et al. | |
| 6,764,705 B2 * | 7/2004 | Shefet | 426/513 |

OTHER PUBLICATIONS

Article, "Batch Ovens", Alkar, http://www.alkar.com (date unavailable; believed to be dated before Mar. 1, 2002) pp. 1-3.

Brochure, "Fessmann Turbomat 7000: Industrial Smoking and Cooking", Fessman Group (date unavailable; believed to be dated Mar. 1, 2002) pp. 1-8.

Brochure, "Fessmann Smoking Cooking Cooling", Fessman Group (date unavailable; believed to be dated before Mar. 1, 2002) pp. 1-8.

Brochure, "Fessmann Transfer 4000: Continuous Smoking, Cooking and Cooling", Fessman Group (date unavailable; believed to be dated before Mar. 1, 2002) pp. 1-9.

* cited by examiner

CASINGLESS FOOD PRODUCTION METHODS, SYSTEMS, AND ASSOCIATED WRAPPABLE COVERINGS

FIELD OF THE INVENTION

The present invention relates to the casingless production of food product.

BACKGROUND OF THE INVENTION

Conventionally, natural or artificial casings can be used to form and hold food products to help hold the shape and/or retain content integrity during processing, such as cooking, heating, or freezing. The food product can start as a flowable emulsion that can be stuffed into the casing or the casing can be formed around the emulsion by employing a co-extrusion process using a stuffer, extruder, or the like. The casing itself may be disposable and removed from the food product prior to shipping and/or eating or may remain intact on the food product during consumption and ingested.

Known extruders and co-extruders are available from various commercial manufacturers including, but not limited to, the Kontura from Townsend Engineering Co., located in Des Moines, Iowa. Stuffers are available from various commercial manufacturers including, but not limited to, HITEC Food Equipment, Inc., located in Elk Grove Village, Ill., Townsend Engineering Co., located in Des Moines, Iowa, Robert Reiser & Co., Inc., located in Canton, Mass., and Handtmann, Inc., located in Buffalo Grove, Ill. Exemplary stuffer and/or linker apparatus are also described in U.S. Pat. Nos. 5,788,563; 5,480,346; 5,049,108; and 4,766,645. The contents of these patents are hereby incorporated by reference as if recited in full herein.

However, there remains a need to provide cost-effective automated casingless processing systems of food items.

SUMMARY OF THE INVENTION

The present invention provides casingless food production systems and methods. The term "casingless" means that the food product can be produced without requiring the assistance of a holding skin such as a collagen or natural skin casing. The term encompasses food items that are conventionally produced using casings (such as hot dogs and sausages and the like), as well as food items that have not required the use of casings (meatballs, popsicles, baked goods, shaped burgers, and the like).

In certain embodiments, the methods and systems are configured to provide casingless lengths of food product using endless wrappable coverings that meet to encase the flowable food product therein. The food product can be configured to enter the wrappable covering as a flowable emulsion that is held encased in the covering as the covering progresses through a molding tube along a predetermined travel path.

In operation, as the product moves forward in the covering, the product is exposed to predetermined processing conditions that alter the physical form of the emulsion to a non-flowable state. The change in the physical state can be chemically or thermally initiated. Over time, the product can take on the shape of the molding tube with sufficient structural rigidity so that it is able to retain that shape without substantial deformation after its release therefrom. As such, in certain embodiments, the released food item may be compressible (semi-solid and yielding to tactile compression forces) or substantially incompressible (frozen or solid) at ambient conditions.

The food may be elongated and regularly shaped (in an elongated or substantially cylindrically configuration) or may be non-elongated and irregularly shaped. The food may be cooked, frozen, smoked, cured, pickled, partially dehydrated, or otherwise processed as it moves through the processing region.

Certain embodiments are directed to methods producing food products that include: (a) moving at least one flexible cover member having a predetermined length with primary surface and opposing lateral edge portions along a predetermined travel path; (b) introducing a flowable food emulsion onto the primary surface of the flexible cover member; (c) wrapping the at least one flexible cover member about the food emulsion during the moving step; (d) advancing the wrapped emulsion into at least one forming tube having sufficient structural rigidity to be substantially non-deformable and having a preformed internal cavity space of predetermined size and shape; and (e) exposing the wrapped emulsion to predetermined processing conditions that convert the flowable emulsion to a non-flowable food product having substantially the molded shape of the forming tube as the wrapped emulsion advances through the at least one forming tube.

The at least one flexible cover member can be a single cover member having a width that is sufficient to define a perimeter with the opposing lateral edges positioned proximate to each other and an internal cavity gap space. The flexible member can have a substantially planar configuration during a major portion of the predetermined travel path. The wrapping operation can be carried out to cause the flexible member to take on a substantially cylindrical shape by moving the opposing lateral edge portions upward and inward so that the lateral edge portions reside proximate to each other.

Other embodiments are directed toward food production systems. The systems include: (a) at least one flexible wrappable member having opposing first and second lateral edges and a primary surface, the flexible wrappable member arranged to extend axially in a predetermined endless travel path, wherein, in operation, the first and second lateral edges are configured such that, in operation, they have a first spaced apart configuration and a second configuration with the lateral edges positioned closer to one another in the second configuration, and wherein, when in the second configuration, the at least one flexible wrappable member defines a perimeter with an internal cavity gap space; (b) at least one forming tube having sufficient structural rigidity to define a preformed cavity space with a predetermined configuration, the at least one forming tube having opposing ingress and egress portions; (c) a flowable food emulsion source that is configured to introduce emulsion onto the wrappable member proximate to the at least one forming tube so that the emulsion resides in the internal cavity space of the second configuration; (d) a transport system that is configured to move the wrappable member so that the wrappable member substantially continuously travels, in serial order, to a first location that is in fluid communication with the food emulsion source, through said at least one forming tube, and then back to the first location; and (e) a processing region having a thermal energy source operably associated with the predetermined travel path so that, in operation, the processing region exposes emulsion in the wrappable member in the forming tube to a predetermined thermal processing condition as the wrappable member travels along a portion of the endless travel path to convert the emulsion held in the at least one forming tube to a non-flowable food product having substantially the molded shape of the forming tube cavity.

In certain embodiments, the system can include wrapping means disposed upstream of the at least one forming tube, the wrapping means configured to wrap the wrappable member into a desired configuration.

The second configuration perimeter can be a closed perimeter that encases the internal cavity space and holds the flowable emulsion therein downstream of the first location and in the forming tube. In the second configuration, one of the respective lateral edge portions can overlap the other. In other embodiments, in the second configuration, the lateral edges abut to define a seam region.

Other embodiments are directed toward apparatus for producing food products. The apparatus includes: (a) means for moving at least one flexible cover member having a predetermined length with primary surface and opposing lateral edge portions along a predetermined travel path; (b) means for introducing a flowable food emulsion onto the primary surface of the flexible cover member; (c) means for wrapping the at least one flexible cover member about the food emulsion during the moving step; (d) means for providing at least one forming tube having sufficient structural rigidity to be substantially non-deformable and having a preformed internal cavity space of predetermined size and shape; and (e) means for exposing the wrapped emulsion to predetermined processing conditions that convert the flowable emulsion to a non-flowable food product having substantially the molded shape of the forming tube as the wrapped emulsion advances through the at least one forming tube.

These and other objects and aspects of the present invention are explained in detail in the specification set forth below.

DESCRIPTION OF EMBODIMENTS OF THE INVENTION

Figure 1:
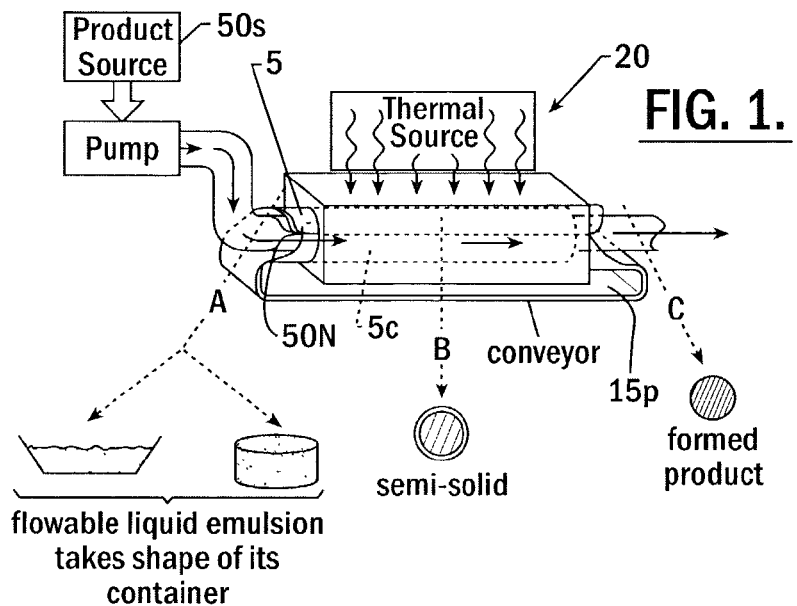
FIG. 1 is a schematic side view of a casingless foodstuff production system employing wrappable surface coverings according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The present invention may be particularly suitable to produce food items such as, but not limited to, elastic or partially elastic food items such as meat products, cheese (e.g., mozzarella strands), or dough. In certain embodiments, the food products are whole or partial meat mixtures that include a single or multiple different types of meat including, but not limited to, beef, poultry, lamb, veal, and pork including derivatives and/or meat analogs of selected ones or combinations of the meat. Other animal, poultry, fish, or desired meats may also be employed where desired. The meat based food products may be meat sticks or strands, elongate meat products such as hot dogs, sausages (of any type including Vienna sausage (typically a beef, pork, and veal emulsion blend)), and the like. In other embodiments, the food products need not be elongate and can be candy and/or frozen dessert snack treats such as ice cream, yogurt, popsicles, and the like.

Generally described, in certain embodiments, the product is produced by introducing (typically injecting) under pressure a flowable food material(s) onto a wrappable surface covering. The wrappable surface covering may be wrapped into a closed perimeter configuration or can be partially or wholly open when the food emulsion or flowable food material is introduced thereon. The wrappable surface covering can substantially wrap around the food (such that edges meet or overlap) to encase the emulsion material. The wrappable surface covering, when wrapped into a desired configuration that holds the food emulsion, can be directed to move through a molding or forming tube. The terms "forming" and "molding" tube are used interchangeably herein.

The flowable material can be configured as an emulsion or slurry of a single "primary" and/or "major" constituent and a liquid (such as water or other food compatible liquid) or an emulsion or slurry mixture of several different major constituents. "Primary" and/or "major" as used herein means that that constituent is present as at least 10% of the volume of the emulsion or slurry. As the wrappable covering with the encased food material travels forward along its selected travel path, the encased material alters to a non-flowable state and takes on the shape defined by the cavity of the wrappable covering and/or tube. In certain embodiments, the product is exposed to predetermined processing conditions that alter the physical form of a flowable emulsion to a non-flowable state. The processing conditions can include one or more of thermal energy (hot or cold), microwave energy, RF energy, UV light, laser energy, and the like.

In certain embodiments, the change in the physical state can be chemically or thermally initiated. In particular embodiments, certain of the constituent ingredients may be chosen so that when combined and exposed to a predetermined activation condition, such as heat, they react to yield a desired change in the physical state or a desired change in the food value. Over time, the chemical or thermal initiated reaction can cause the product to harden or become more viscous and non-flowable and form substantially into the shape of the wrapped covering and/or tube. Upon release, the product has the shape of the wrapped covering and/or tube, modified with surface textures or indicia provided by the surface wrapping. As such, in certain embodiments, the released food item may be compressible (semi-solid and yielding to tactile compression forces) or substantially incompressible (frozen or solid) at ambient conditions. The forming tube or mold itself is configured with sufficient structural rigidity so that it is able to define a mold cavity without the emulsion held therein and to resist deformation when the emulsion and covering are introduced into the cavity of the forming tube under pressure sufficient in magnitude to cause the product to contact and expand the surface covering to substantially fill and/or take the form of the forming or molding tube cavity.

In certain embodiments, the flowable emulsion may be a meat product emulsion that can include additives, flavorings, vegetables, fruits, spices, or other edible biocompatible constituents. Some constituents of the flowable emulsion may include fluids, such as liquids, solid particulates of various sizes, and ground, shredded, segmented or otherwise processed meat, meat analogs, or derivatives thereof. In certain embodiments, the emulsion can be viscous, while in others it may be semi-viscous and/or substantially inviscid at the initiation of the process (such as at introduction into the covering). Thus, the systems contemplated by the present invention may be used to process food products in a wide variety of density ranges (low to high), such as water (to ice), fluffed creams, meat or meat analog slurries, and the like.

The emulsion can be selected to yield elongated food items including, but not limited to, hot dogs, sausages, and the like. The end item may be elastic so as to allow some stretching without unduly altering or deforming its desired shape (from that of the mold shape) after release from the forming tube and/or the wrappable surface covering during processing. Alternatively, the emulsion, forming tube, and wrappable coverings may be formulated so that discrete non-elongated products such as shaped meatballs and other food products may be produced.

In particular embodiments, after the product exits the forming tube or as it travels in the forming tube encased by the wrappable covering, the product can be coated with a desired edible surface coating, such as, but not limited to, sugar, chocolate, candy sprinkles, and the like for sweet or dessert products or corn meal for corndogs, flour or other edible coating for other food products. The coating may be aerosolized, sprayed, pressed or otherwise deposited onto all or selected exterior surfaces of the product.

Turning now to FIG. 1, one embodiment of a casingless food production system 10 is shown. As shown, the system 10 includes a traveling wrappable covering member 5, a forming or molding tube 15, a thermal source in a processing region 20, and a flowable foodstuff supply source 50S. In the embodiment shown in FIGS. 1 and 2A–2B, the wrappable covering member 5 is a resilient member defined by single flexible endless conveyor belt 5f that has a width ("W", FIG. 2B) sized so that, in operation, opposing side edges $5e_1$, $5e_2$ can be wrapped to meet and/or overlap to define a cavity space. The width of the wrappable member 5 and the cross-sectional shape of the forming tube 15 help define the volume, shape, and/or size of the cavity space. The amount and density of the emulsion 30e, as well as the selection of material that forms the wrappable member 5 and the tension thereof, can also influence the size and shape of the cavity space 5c as the wrappable member 5 can, in certain embodiments, flex outwardly in the direction of the forming tube 15 as the emulsion 30e fills the cavity space 5c and forces the flexible wrappable member 5 outward.

Figure 10A:
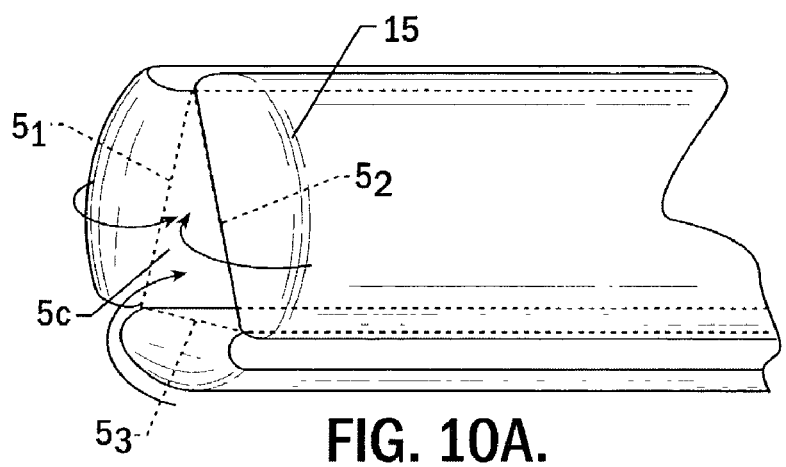
FIG. 10A is a schematic perspective side view of a processing system employing multiple wrappable surface coverings that meet in a forming tube to encase the product according to certain embodiments of the present invention.
Figure 10B:
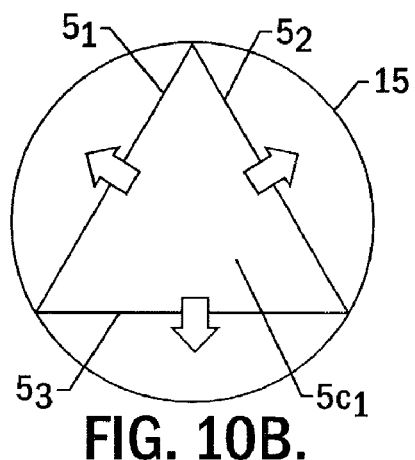
FIG. 10B is a front view of the forming tube and wrappable surface coverings shown in FIG. 10A.
Figure 10C:
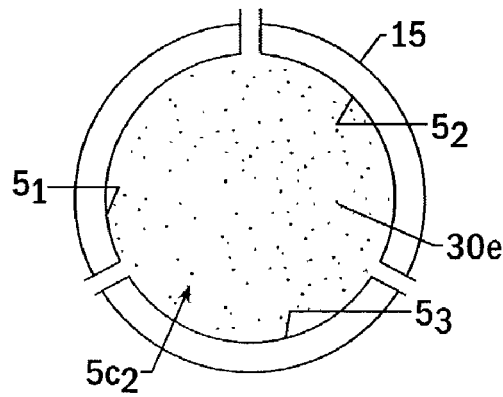
FIG. 10C is a front view of the forming tube and wrappable surface coverings shown in FIG. 10B with the coverings expanded outwardly responsive to pressure generated by the emulsion held therein according to certain embodiments of the present invention.
Figure 10D:
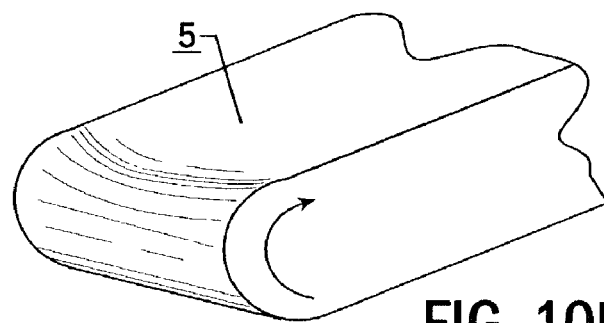
FIG. 10D is a partial front perspective view of a wrappable surface cover member that illustrates that the food contacting surface covering can be configured with a concave face according to embodiments of the present invention.

Alternatively, the wrappable member 5 can be a plurality of members that are directed to meet to encase the emulsion 30e. For example, as shown in FIG. 10B, the wrappable member(s) 5 (shown as three members $5_1$, $5_2$, $5_3$, in this embodiment) have a first substantially non-outwardly flexed configuration in the absence of emulsion. FIG. 10C then illustrates a second outwardly flexed configuration when filled with emulsion forcing the wrappable member(s) 5 to contact and substantially take on the shape of the forming tube 15. FIG. 10D is a partial view of a wrappable surface covering 5 that illustrates that the covering can be preformed to have a concave face according to embodiments of the present invention. This configuration can be used as a single wrappable covering member 5 or as one of the plurality, each of the plurality or selected ones may be preformed into a concave configuration.

The wrappable cover member 5 may be configured as any suitable food compatible flexible or wrappable material, such as, but not limited to, cloth (which may be woven), paper, elastomer, polymer, metallic or other mesh material, and combinations thereof. The cover member 5 may be a thin (less than about 0.5 inches, typically less than about 0.10 inches) flexible member.

Referring back to FIG. 2B, the wrappable member 5 is disposed intermediate the emulsion 30e and/or product 30p and the forming tube 15. FIG. 1 illustrates exemplary changes in the density or structure of the product 30p as it moves through the processing station 20 (shown as a thermal station with a heat source). The circular shapes labeled as "A", "B", and "C" illustrate an exemplary alteration in density or flowability of the food as it travels along the food travel path. At location "A", the product is a flowable emulsion, at location "B" some physical alteration has occurred (illustrated as a thicker density at the outermost portions of the food), and at location "C" the food has been processed so that it is of a substantially constant consistency through its center (e.g., cooked). The exemplary condition of the food at location "B" can vary depending on the production exposure environments or thermal processing conditions. For example, RF or microwave thermal processing or combinations of processing environments/exposures may result in a different food density gradients. Other alteration patterns may occur depending on the desired processing result, the type of processing employed, the thickness of the tube and/or covering and the food being processed.

In the embodiment shown in FIG. 1, the wrappable covering 5 has an endless travel path and is configured to automatically repeatedly travel about that travel path. The system 10 also includes a transport or drive system 11 (FIG. 2A) that moves the wrappable covering member 5 along its predetermined travel path. The transport system 11 can comprise conveyors, belts, chains, cables, cords, or other drive means connected to a drive motor to move the wrappable member 5 and direct the wrappable member 5 to come together at predetermined portions of the travel path. The speed that the wrappable member 5 moves along its endless path can be selected so that the food is exposed to the desired food processing conditions for the desired time.

Figure 2A:
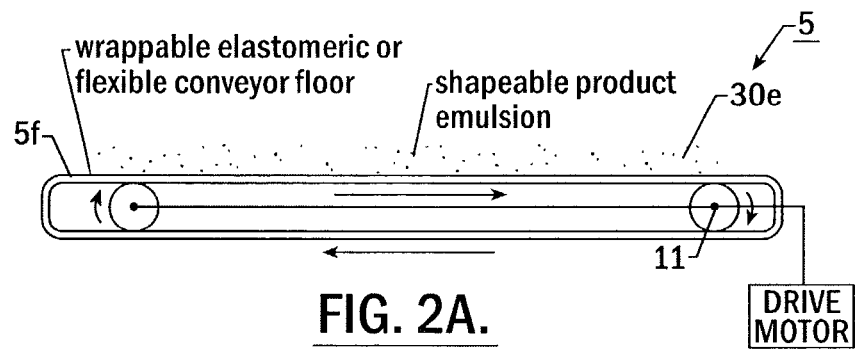
FIG. 2A is a schematic side view of a wrappable surface covering having a predetermined endless travel path according to embodiments of the present invention.
Figure 2B:
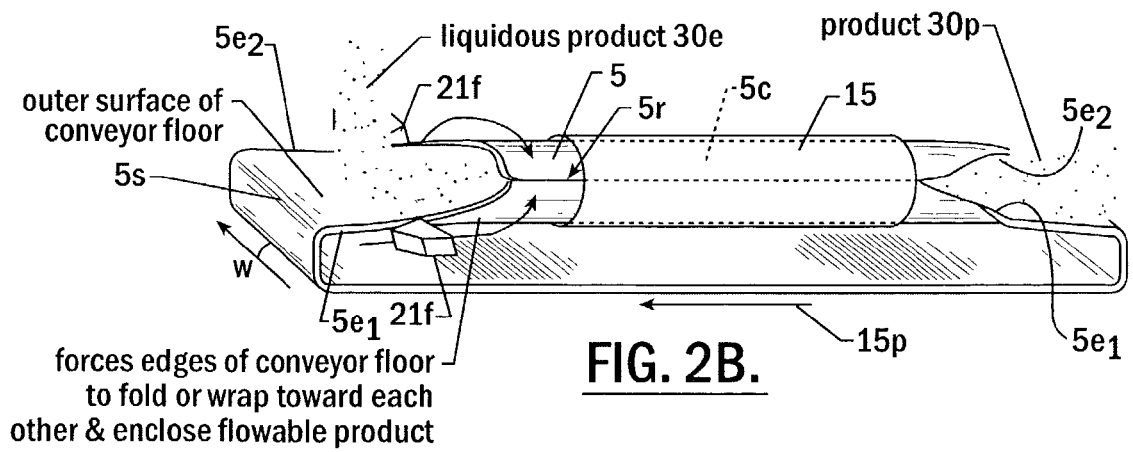
FIG. 2B is a schematic side perspective view of a casingless production system with a forming tube, the wrappable surface covering thereof configured to travel therethrough in its travel path according to additional embodiments of the present invention.

In operation, for the embodiment shown in FIGS. 1, 2A and 2B, the wrappable covering member 5 travels about its predetermined travel path 15p. As the wrappable covering member 5 approaches the emulsion source 50s, the opposing lateral edge portions $5e_1$, $5e_2$ are wrapped or directed up and toward each other so that the wrappable member 5 closes about itself to define the outer perimeter of an enclosed cavity space 5c. The lateral edge portions $5e_1$, $5e_2$, may meet about a seam region 5r (FIG. 2B) that is substantially flush with the opposing edges. Alternatively, the seam region 5r may be formed by holding one edge portion under the other so that there is an overlap in the seam region 5r. The wrappable member 5 may be forced by positioning forming members in the travel path to cause the wrappable member 5 to wrap into a desired configuration. Although shown as being wrapped upwardly, the side edges can also be wrapped downwardly so that the seam region is on the bottom. In other embodiments, the wrappable member 5 can be oriented so that the opposing edges are wrapped together to meet at a side location, rather than a top or bottom location (not shown).

In certain embodiments, as shown in FIG. 2B, forming fingers 21f can be placed in the covering 5 travel path so that the opposing lateral edge portions $5e_1$, $5e_2$ are forced inwardly as the wrappable member 5 moves forward and approaches the forming tube 15. The forming fingers 21f may float or be configured to rise vertically to force the edge portions upward and inward. A series of forming fingers 21f can be positioned to incrementally force the wrapping operation to occur along the travel path in advance of the forming tube 15 (not shown). The forming tube 15 itself may be configured and sized to facilitate the wrapping and/or to force the closing or meeting of the edge portions $5e_1$, $5e_2$. Similarly, a series of differently sized or shaped forming tubes 15 or forming mandrels (such as with decrementing sized interior spaces and/or rising sides) may be spaced apart about the travel path to cause the wrappable member to wrap about the cavity space. The forming tube 15 may use a spool or mandrel to facilitate the forming of the cavity space 5c prior to or upstream of the emulsion introduction location (not shown).

In other embodiments, instead of and/or with the forming fingers 21f, a channel of upwardly extending side portions can be positioned along the travel path 15. The channel can have a width that decreases as it approaches the forming tube 15. In operation, the decreasing width and upwardly extending side portions can be used to direct the sides of the wrappable member to curve or rise upward to meet at the forming tube 15 (also not shown). Other forming or wrapping operations and devices may also be used as is known to those of skill in the art.

In any event, the wrapped member 5 then enters the forming tube 15 and moves through the length of forming tube 15. The emulsion 30e can be introduced onto the wrappable member 5 in advance of the forming tube 15, prior to the wrapping member forming the cavity space 5c or after or proximate to the forming tube 15 when the cavity space is set. The emulsion 30e can be flowably pumped and/or injected into the tube and/or onto the exposed primary surface of the wrappable member 5. As the emulsion travels through the tube 15, it can be exposed to desired processing conditions. In the embodiment shown in FIGS. 1 and 2B, the emulsion 30e is exposed to thermal processing conditions causing it to change its density or physical condition or structure. At the end of the forming tube 15, the wrappable member 5 exits, and the opposing edge portions $5e_1$, $5e_2$, separate to open (unwrap) the cavity space 5c to expose the product 30p. That portion of the unwrapped member 5 then continues back or returns along its predetermined travel path 15p to start the process again. If the emulsion 30e is continuously introduced, a continuous strand or length of product can be produced or released at the end of the forming tube 15. Intermittent introduction can provide shorter lengths.

Figure 3A:
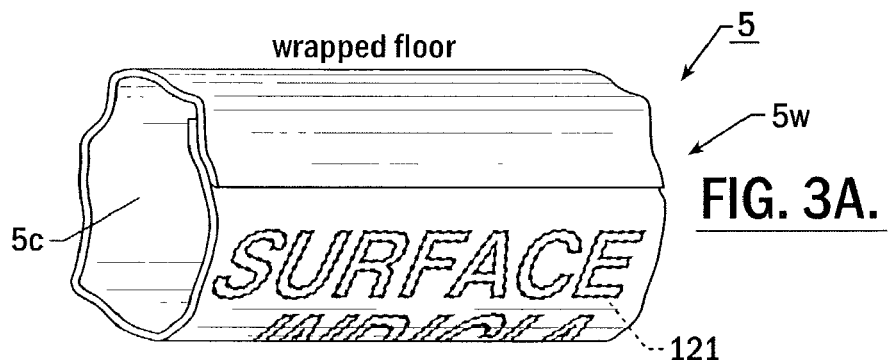
FIG. 3A is a partial schematic view of a wrappable covering shown in a wrapped (overlapping) configuration according to embodiments of the present invention.
Figure 3B:
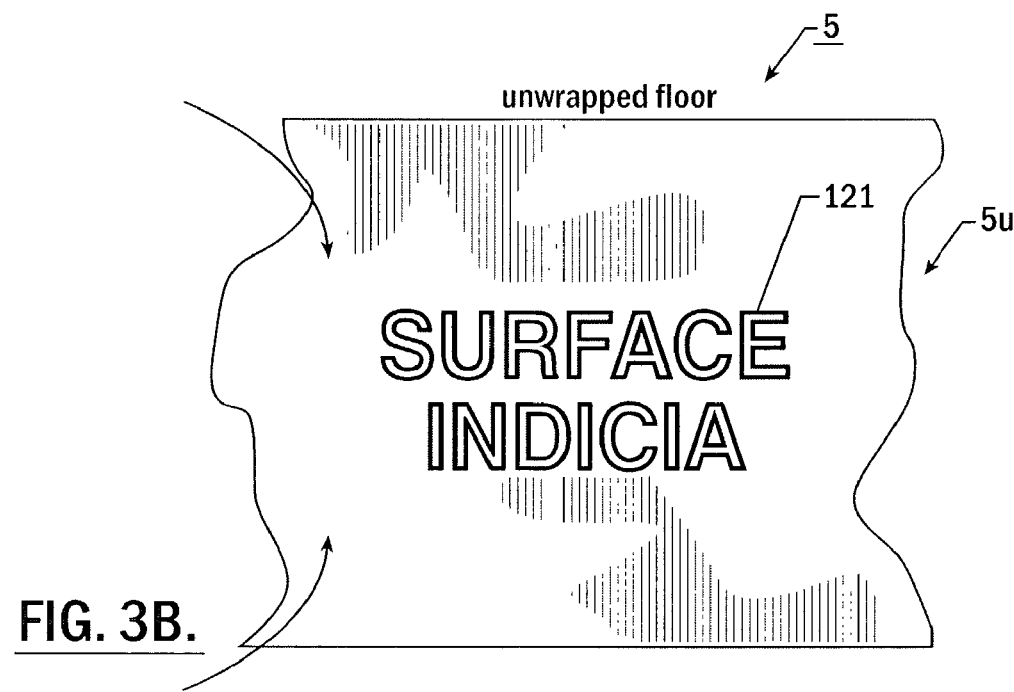
FIG. 3B is a partial view of a portion of the wrappable covering of FIG. 3A, shown in an open or unwrapped configuration according to embodiments of the present invention.
Figure 3C:
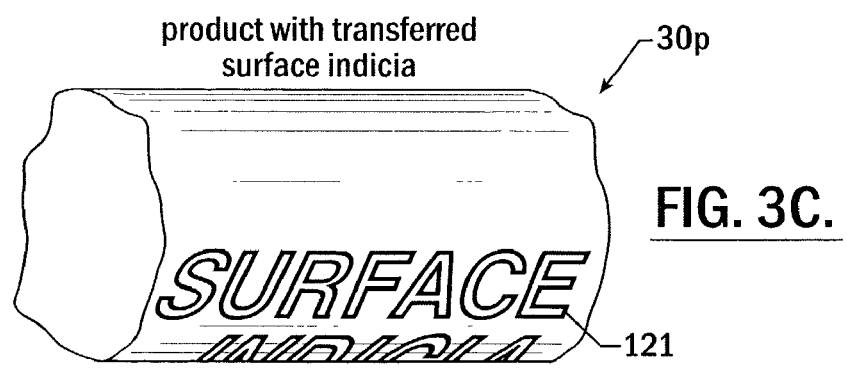
FIG. 3C is a partial side perspective view of a processed food product that is shaped and includes surface indicia corresponding to that on the wrappable covering shown in FIGS. 3A and 3B.

FIG. 3A illustrates one example of a wrapped member 5w that defines the cavity space 5c. The wrapped member 5w can be formed by a conveyor floor. FIG. 3B illustrates an unwrapped configuration 5u of the member 5. FIGS. 3A and 3B also show that the wrappable member 5 can include surface indicia 121 thereon. The surface indicia 121 can be configured in a pattern corresponding to the surface pattern desired to be transferred or formed into the externally viewable surface of the molded food product 30p (FIG. 3C). The surface indicia 121 can be formed a desired depth into the outer surface of the product 30p, depending on the configuration of the indicia on the wrappable covering member 5, the force or amount of emulsion 30e used to fill the forming tube and member 5 cavity, and the formulation of the emulsion 30e and/or product 30p itself. The surface indicia pattern 121 can be configured as a recessed female deformation pattern and/or as a raised male deformation pattern.

One or both opposing lateral sides of the primary surface (food contacting surface) of the wrappable member 5 can include the same; different, or cooperating complementary indicia that together define a continuous pattern extending over the outer surface of the food. Different patterns can be used about different lengths of the wrappable member to produce differently marked food items 30p (not shown). The depth or projection distance of the surface indicia 121 can be configured to provide a sufficiently prominent transferred pattern formed onto the exterior of the food product as the emulsion flows into the cavity 5C and takes on the molded shape defined by the cavity 5C and/or molding tube cavity as the food 30e is moved along the predetermined travel path 15p in the food processing system 10. In certain embodiments, the surface indicia 121 can comprise alphanumeric indicia. In particular embodiments, the surface indicia can include a design shape, decorative pattern, or figure, such as a product or company logo, mark, and the like. In other embodiments, the inner surface of the member 5 can be configured to impart a desired surface marking or texture, such as representing seared grill marks, predetermined visually darker regions, and the like. In particular embodiments, the surface indicia 121 can be provided by recessed wells (female deformations) that can hold a dye to allow for selective color application.

Figure 6A:
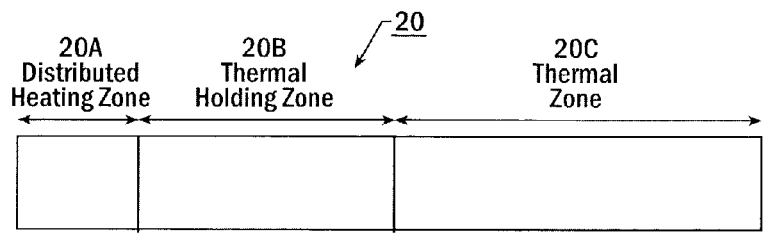
FIG. 6A illustrates three different exemplary processing conditions along a food travel path according to embodiments of the present invention.

The processing region 20 can include different processing environments. By way of illustration, as shown in FIG. 6A, the system 10 can include a plurality of processing regions. As shown in FIG. 6A, it includes three different processing regions 20A (shown as a heating zone), 20B (shown as a thermal holding zone), and 20C (shown as a second thermal zone, which may be a cooling zone), each of which can present a different environment for the food. The emulsion and/or food 30e/30p can travel encased in the wrappable covering member 5 throughout each processing region 20A, 20B, 20C or can be released from the wrapped covering 5w (FIG. 3A) at a desired region and processed independent of the tube 15 and/or covering member 5 after traveling through a selected portion of the processing system 10 (such as after traveling through major portion of one region 20A or two regions 20A, 20B (FIG. 6A).

In certain embodiments, as shown in FIG. 1, the supply source 50S comprises an injection nozzle 50N that is configured and positioned to be in fluid communication with the rearward portion of the forming tube 15. The nozzle 50N can be operated to substantially continuously, or at desired intervals, introduce the emulsion into the wrappable member and forming tube 15. The nozzle 50N may be held stationary in the travel path of the wrappable member upstream or proximate the tube 15. Alternatively, the nozzle 50N may be dynamically operated, such as inserted into and retracted from the forming tube 15 and/or wrappable member 5. The speed of forward movement of the wrappable member as well as the flow rate of the emulsion can be selected to inhibit the undue loss of product through rearward flow or exit through the seam region.

In certain embodiments, the tube 15 and/or the wrappable member 5 can be preheated or pre-cooled prior to the introduction of the emulsion therein to cause the outermost portion of the emulsion to gel relatively quickly in the cavity 5c, thereby inhibiting excessive spill, flashing, or leakage from the cavity or member 5.

The wrappable member 5 can be directed to travel through a sterilization region after it opens or unwraps and before it returns to accept another quantity of emulsion. The exposure can be for a period of time to allow cleansing or sterilization of the food contacting surfaces. The sterilization region can be located along a portion of the travel path and periodically activated (or continuously activated). Thus, the sterilization or cleansing may be carried out automatically by directing the travel path to extend through such a processing region.

In certain embodiments, the travel path can be sized and configured to produce two products per cycle (not shown). That is, the system 10 can include a second filling station that is located downstream of the first supply station. The wrappable member 5 can be directed to close or wrap again and directed to travel through a separate second forming tube also downstream of the first forming tube 15. Thus, the wrappable member 5 can meet to close, enter a forming tube 15, and open twice along a single cycle of its travel in the travel path 15P.

It is noted that the wrappable member 5 and/or the forming tube 15 can be formed of a food-compatible material. In addition, suitable food-compatible coatings or lubricants may also be deposited onto the inner surfaces of the cavities (the inner surface of the forming tube and/or the inner surface of the wrapped member 5w) as well as the outer primary surface of the member 5 to inhibit contact adherence, promote movement, and/or promote ease of removal. Such coatings may be integral to the cavity material, or applied at desired intervals from an exogenous source.

Figure 4A:
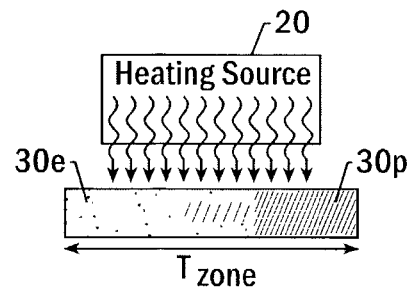
FIGS. 4A–4C are schematic illustrations of examples of alterations in the physical state or consistency of the emulsion held in the wrappable covering as it travels along the food travel path and is exposed to selected thermal processing conditions according to embodiments of the present invention.
Figure 4B:
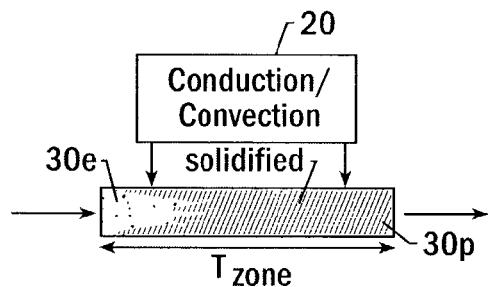
Figure 4C:
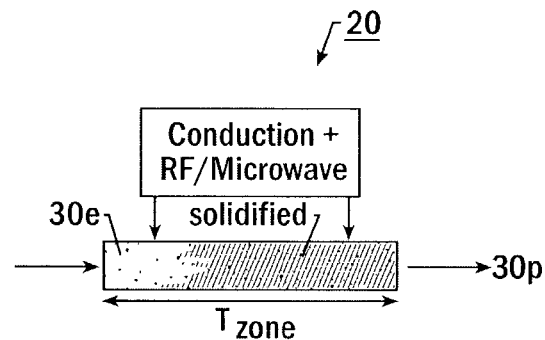
Figure 5:
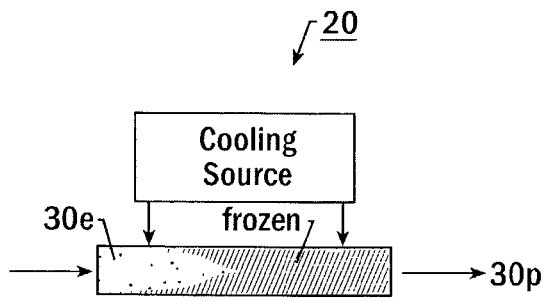
FIG. 5 is a schematic illustration of an alteration in the physical state or consistency of the emulsion held in the wrappable covering as it travels along the food travel path and is exposed to selected cooling processing conditions according to embodiments of the present invention illustrating that a cooling source may be used in the processing region to facilitate the molding or alteration of the flowable emulsion to a non-flowable molded shape.

FIGS. 4A, 4B and 4C illustrate that the product 30p can be processed in different manners, each of which may generate a different distribution pattern of the emulsion to the formed product. FIGS. 4A–4C each illustrate a processing region or thermal zone over the length of which the emulsion 30e undergoes the heating and molding into a structurally suitable shaped (non-flowable) product 30p. FIG. 5 illustrates a similar variation using a cooling source to produce the molded product 30p. The darker shades rendered in the graduated shading shown in FIGS. 4A, 4B, 4C and 5 illustrate cooked, frozen, or increased density alterations in the emulsion 30e from its original flowable state.

As discussed above, the processing region 20 can include one or a plurality of different treatment zones or environments. In applications that cook or heat the product 30p, the cooking, heating and/or cooling can be carried out by any suitable energy generating means as discussed above, including, but not limited to, microwave, RF, UV light, laser energy, thermal energy (heating in a conventional convection or conduction oven or cooling of freezing in refrigerators/freezers), radiation energy, and the like, as well as combinations of same. As such, as the emulsion 30e travels through the processing region 20, along the predetermined travel path, it can be heated for predetermined times and temperatures.

In certain embodiments, as shown in FIG. 6A, the processing region 20 comprises three different treatment zones: (a) an active or distributed energy generating zone 20A that is used to expose the food emulsion to a desired thermal energy at a desired time versus temperature profile; (b) a thermal (equilibrium) holding zone 20B where the temperature of the product is held substantially constant; and (c) a thermal zone 20C, which may be a cooling zone where the temperature of the product is reduced. FIGS. 6B–6E illustrate examples of different time versus temperature profiles of exemplary processing conditions corresponding to the different processing regions. The temperature profile may correspond to a selected location in the product (such as a center region of the product to promote reliable cooking). Other temperature profiles, residence times, and the like can be used depending on the application.

Figure 6B:
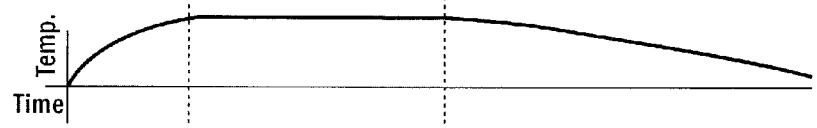
FIGS. 6B–6E are graphs of profiles of processing temperature as a function of time for the system of FIG. 6A according to embodiments of the present invention.
Figure 6C:
Figure 6D:
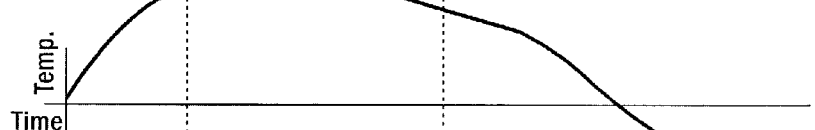

FIG. 6B illustrates that the product temperature is returned to ambient temperature and the thermal holding zone can hold the product at a substantially constant internal temperature. FIG. 6C illustrates that the thermal processing may raise the internal temperature and then lower the product temperature to a cooled or frozen refrigerated temperature (the line extending below the initial condition). FIG. 6D also illustrates that the thermal holding zone can allow the product to increase in temperature and then hold a substantially constant temperature for a desired time. FIG. 6D illustrates that the holding zone may decrease the internal temperature before the product enters the cooling zone. Where used, the cooling zone may be non-active or non-force cooled (fans or natural air cooling can be used) to return the product to ambient.

Figure 6E:
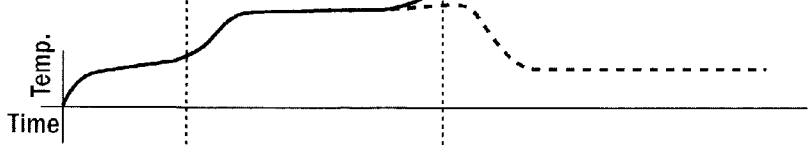

FIG. 6E illustrates that the last thermal zone may be another heating zone (top line) or a cooling zone (broken bottom line). Each thermal region may increase (or decrease) the temperature and then hold that temperature for a desired time. The top line indicates that the thermal temperature is increased in the initial portion of each thermal zone. Other heating and cooling cycles or operations may also be used. For example, as shown in FIG. 6E, each thermal region can increase the temperature of the product and include a thermal holding zone. As shown, the thermal processing can be carried out to provide three increased ramped slope portions, each ending in a more level horizontal "holding" temperature portion. The thermal processing can be carried out to include cooling or combinations of heating and cooling.

In particular embodiments, the thermal heating zone and/or the thermal holding zone are configured to raise the internal temperature of the emulsion to a desired temperature for a desired time. For example, in certain embodiments, the processing region 20 can be configured to raise the internal temperature of the wrapped or unwrapped emulsion or product 30e/30p so that it reaches at least about 150 degrees Fahrenheit for a predetermined time. In particular embodiments, for meat emulsions, the product may be cooked to an internal temperature of about 158 degrees Fahrenheit.

In other embodiments, the product 30p can be cooked and then frozen in preparation for shipment. The product should be structurally sufficient (such as after cooking but before freezing) so that it can substantially maintain its molded shape when removed from the wrapped covering 5w and/or forming tube 15. In yet other embodiments, the product 30p can be directly frozen without cooking (typically for food intended to be eaten in a frozen state).

In certain embodiments, the processing region 20 is configured to heat the emulsion or product with one or more microwave energy generators to generate about 400–600 kW of microwave energy in the thermal distribution region to cook the emulsion in the shells for predetermined times and energy levels as the emulsion travels enclosed in the shells along the predetermined travel path. For example, five 100 kW generators operating at about 85% efficiency can generate about 425 kW of microwave energy that can be directed to a certain (typically shielded) portion of the processing region 20.

Figure 9A:
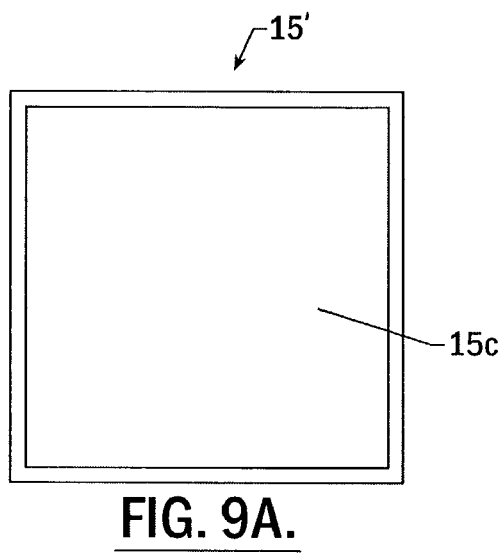
FIGS. 9A and 9B are front section views of forming tubes configured to provide non-customary cross-sectional profiles of food products according to embodiments of the present invention.
Figure 9B:
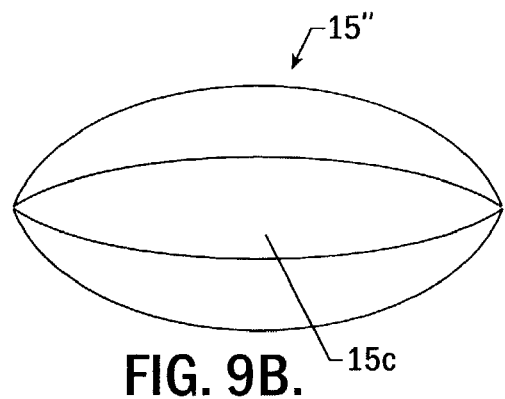

FIGS. 9A–9B illustrate that the forming or molding tube 15 can be configured with cavities 15c to provide molded food product in non-conventional or irregular cross-sectional (and/or side sectional) shapes. FIG. 9A illustrates a block shape (such as square or rectangular). If molded with sufficient lengths of emulsion, this configuration would produce a product 30p shape that is similar to a bar (not shown). FIG. 9B illustrates a football sectional shape that can be produced in the axial direction. Thus, the forming tube 15 configuration can be selected to provide a non-circular cross-sectional product, a product with an irregular complex or non-constant shape cross-sectional profile, and/or an irregular side profile with an elongate but non-cylindrical shape.

The thickness and type of materials selected to form the forming tube 15 as well as the wrappable member 5 may depend on the production environments that the food will be exposed to as well as the configuration (type and size) of the food being processed. For example, light, microwave, thermal (heat and/or cooling), and RF energies may have different demands that promote uniform and reliable transfer of the treatment to the food product and/or suitable exposures and exposure rates in an aesthetically acceptable manner. The forming tube 15 can be formed of stainless steel (such as 316 stainless steel) or other food-compatible material. In other embodiments, at least a portion of the forming tube 15 is formed of a non-metallic material. The inner surface of the forming tube 15 and the inner and/or outer primary surfaces of the wrappable member 5 can be configured with a non-stick surface and/or include lubrication. Examples of non-metallic material types include, but are not limited to, resin or fiber reinforced resin, ceramic, polymer or co-polymer and blends and derivatives thereof or plastic material (such as polyvinylchloride "PVC"), silica (such as aluminosilicate or glass), or other suitable material having sufficient rigidity to withstand the operating pressures and heat. Suitable food-compatible coatings, claddings, or lubricants may also be deposited onto the surfaces of the inner wall or surface of the forming tube mold cavity 15c to inhibit contact adherence thereto. Such coatings or lubricants may be integral to the cavity material, or applied at desired intervals from an exogeneous source. One suitable material and/or coating is TEFLON® polymer.

In certain embodiments, the system 10 can include a portion (such as a window or cylindrical ring) that is optically translucent or transparent to allow visualization or optical sensing of the state (intensity) of the emulsion 30e and/or product 30p as it travels therethrough. An optical encoder (not shown) can be used to provide an alert when image density data is outside expected limits, thereby indicating a potential problem in the processing of the emulsion (such as over-or under-cooking or cooling or an emulsion composition irregularity).

Figure 7A:
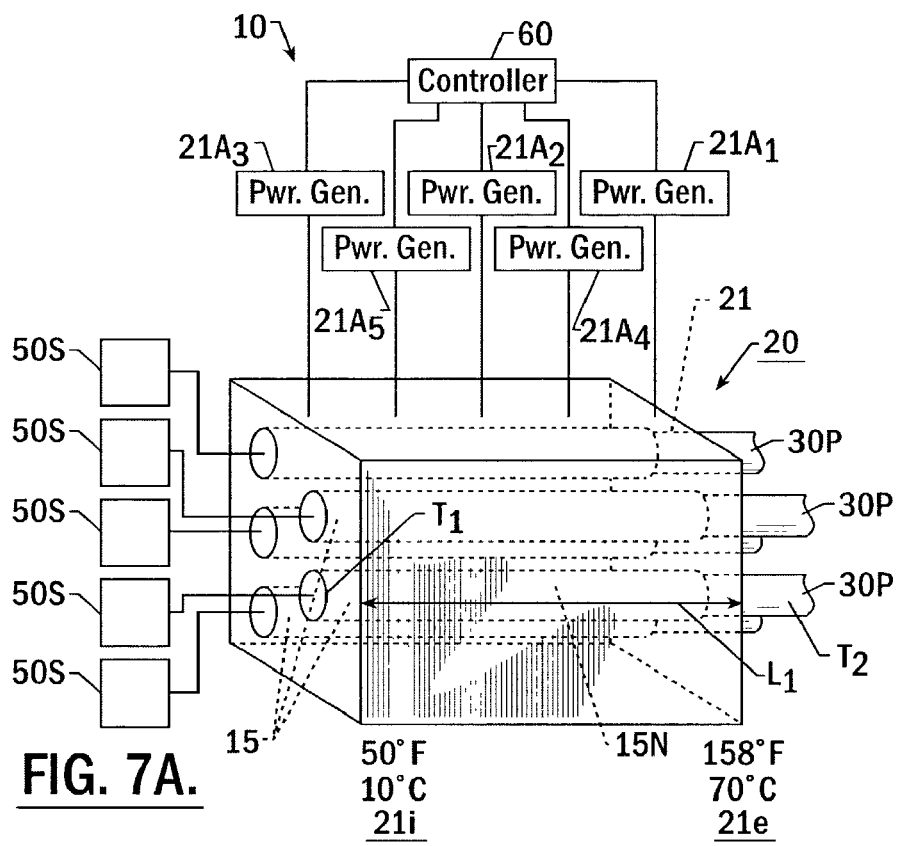
FIG. 7A is a schematic illustration of a processing system that includes a plurality of forming tubes of production lines according to embodiments of the present invention.
Figure 7B:
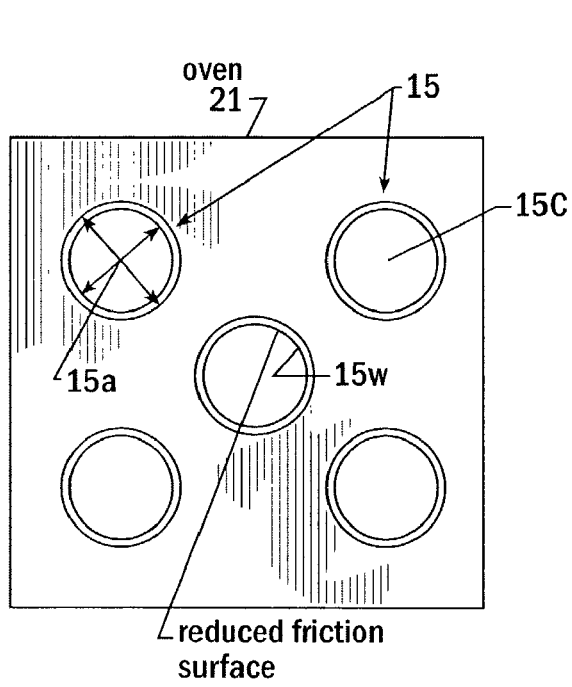
FIG. 7B is an enlarged end view of one exemplary arrangement of the plurality of forming tubes in the system shown in FIG. 7A.
Figure 7C:
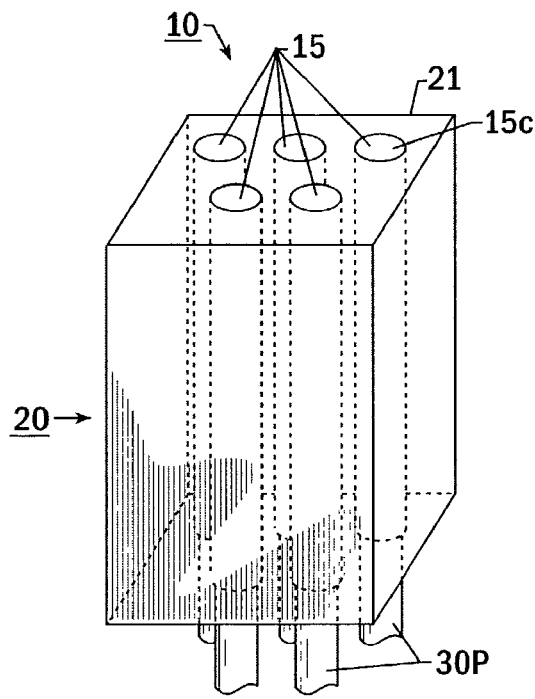
FIG. 7C is a schematic illustration of a processing system similar to that shown in FIG. 7A, but showing vertical food forming paths according to embodiments of the present invention.

In certain embodiments, as shown in FIG. 7A, the processing region 20 may comprises a microwave oven 21 that is sized to process a plurality of separate production lines (for clarity, the wrappable member 5 is not shown in FIGS. 7A–7C). As such, the forming tubes 15 can have a non-metallic 15N region along at least the length $L_1$ that corresponds to or is coextensive with the inner space of the microwave oven 21.

As discussed above, the processing region 20 can include one or a plurality of different treatment zones or environments. In applications that cook or heat the product 30P, the cooking, heating and/or cooling can be carried out by a selected one or combination of any suitable energy generating means as discussed above, including, but not limited to, microwave energy, RF energy, UV light, laser energy, thermal energy (heating in a conventional convection or conduction oven or cooling of freezing in refrigerators/freezers), radiation energy, and the like. As such, the emulsion 30e travels through the tube 15 encased in the wrapped member 5 in the processing region 20, along a predetermined travel path, and can be heated (and/or cooled) for predetermined times and temperatures.

FIG. 7A illustrates that a plurality of different spaced apart forming tubes 15 can be encased or directed to extend through a common processing region 20. As shown, the processing region 20 includes an oven 21. The oven 21 is configured to enclose the plurality of forming tubes 15. The oven 21 can include one or a plurality of thermal sources (shown as five designated as $21A_1$–$21A_5$ in FIG. 7A). Each can generate thermal energy for a respective forming tube 15, or for localized regions in the oven, and/or to provide a substantially constant energy exposure across the oven so that the energy is distributed in a predetermined manner across the emulsion traveling in each of the tubes 15.

FIG. 7A also illustrates that the temperature of the product can be raised from a first starting temperature $T_1$ to a second predetermined cooked temperature $T_2$. In certain embodiments, the second temperature may be at least about double the starting temperature (measured in degrees Fahrenheit). In the embodiment shown in FIG. 7A, the temperature of the emulsion 30e may be increased from about 50° F. (10° C.) to about 158° F. (70° C.) from the ingress portion of the oven 21i to the egress portion of the oven 21e.

In certain embodiments, the oven 21 is configured to heat the emulsion 30e with one or more microwave energy generators to generate about 400–600 kW of microwave energy generated in the temperatures zone or thermal distribution region to cook the emulsion in the shells for predetermined times and energy levels as the emulsion travels enclosed in the forming tube. The power generators $21A_1$–$21A_5$ shown in FIG. 7A can be five 100 kW generators operating at about 85% efficiency can generate about 425 kW of microwave energy that can be directed to a certain portion of the processing region 20 (typically one shielded from the plant or adjacent processing regions).

In particular embodiments, the processing conditions can be set to introduce a simulated skin layer onto the outer surface of the emulsion or product. The simulated skin can be formed before or after its release from the covering member 5. That is, relatively hot or high-energy applied to the outer perimeter of the emulsion 30e or food product 30p can provide an increased density or drier region relative to the inner portion of the resultant non-flowable edible product. The depth or thickness, as well as the density or hardness of the skin layer, can be adjusted by the processing conditions. The wrapped member 5 itself may be heated (or preheated) and/or the tube 15 may be heated (or preheated) to apply contact heat to the wrappable member 5 that is localized at the outer surface of the underlying food material to apply contact heat that is localized at the outer surface. In other embodiments, RF or microwave energy and the like can be used.

FIG. 7B illustrates that each of the forming tubes 15 in the oven 21 can be in the same configuration (size and shape). In other embodiments, different size and/or shaped forming tubes 15 (not shown) can be used. The forming tubes 15 can be formed with a selected cross-sectional area and length (defining a known volume) and the rate of flow adjusted to the volume so as to provide the desired pressure and/or allow the wrappable member 5 to travel therethrough to move the product forward.

As shown, the forming tubes 15 can have the same lengths and be configured to extend through substantially the entire length of the oven space associated with the processing region 20. In other embodiments, a respective production line may have a different length forming tube 15 and the product or emulsion therein can be directed to exit the oven at a different egress portion (not shown). Each of the forming tubes 15 can be associated with a respective production line, each capable of concurrently producing molded or non-flowable products 30p. As such, the forming tube 15 for each production line can be configured so that food material and respective wrappable members 5 travel concurrently through a common processing region (using a processing region configured to surround a plurality of forming tubes for a plurality of production lines, with a shared heating, holding and/or cooling region). Each line may be operated to yield the same product in the same or different shapes or sizes, or different products.

As shown in FIG. 7A, the system 10 may include a central controller 60 that directs the operation of a plurality of different energy sources. The controller 60 can adjust the energy generated depending on the type of product traveling in the processing region (such as the size (volume) of the forming tube and/or type of emulsion mixture in the wrappable member 5 in the forming tube 15N). The controller 60 may also be used to adjust system pressure, pump rate, valves associated with the flow path and emulsion supply source, and the like. The energy sources or power generators may be of the same type and operated to maintain a homogenous or constant energy or temperature region in the processing region. Alternatively, selected ones of the energy sources or power generators may be operated to produce local "hot" or "cold" spots or graduated heating or cooling treatment zones as desired.

FIG. 7A illustrates that the forming tubes 15 may be oriented above, below, and/or transversely spaced apart from the others and directed to flow in a substantially horizontal throughput configuration through the processing region 20. FIG. 7C illustrates a tube assembly configuration with a plurality of spaced apart forming tubes 15 held in a substantially vertical orientation. The tubes 15 (one or more)

can be held in a diagonal, sloped, curvilinear and or other configuration, arrangement and/or orientation (not shown).

In certain embodiments, the devices, systems, and methods of the present invention can be used to continually produce a series of lengths of product that can be cut or separated into desired lengths, or which can be ejected from the wrappable member 5 and/or forming tube 15 in a substantially desired predetermined length of a discrete product.

The term "continually" means that the apparatus can be configured to expel or provide a series of products substantially constantly over a production shift or batch. In certain embodiments, the systems 10 can be configured to process individual shells with emulsions therein to produce product at a rate of about at least 1 fps.

In particular embodiments, it is believed that certain systems contemplated by the present invention may be configured to produce over about 200 linear feet of elongate consumable meat product in less than about 1 minute. Such an automated process may be employed without requiring direct manual labor to form or remove the products from the tube 15 and/or wrappable member 5, and, hence, may be particularly suitable for mass-production environments. In other particular embodiments, the system 10 may be configured with a plurality of production lines running at a rate of about 3 fps or more to produce about 5,000–15,000 lbs/hour of the same or different food products using the forming tubes contemplated by the present invention. In certain embodiments, the system 10 is configured to yield at least about 900 lbs/hour and, in other embodiments, the system may yield about at least 10,000 lbs/hour of product 30P.

In certain embodiments, the tubes 15 can be configured with about a one-inch outer diameter and/or about a 0.75 inch inner diameter. Thus, in certain embodiments, such as those using five parallel lines as shown in FIGS. 5A, 5C, 6A, 6B, and 6C, and a flow rate through the tubes of about 3 fps of emulsion, which may be heated by independently controlled generators ($21A_1$–$21A_5$ as shown in FIG. 5A) and wave guides and applicators in 316 SST (and/or aluminum) (not shown) with the tubes 15 formed of TEFLON with plastic welded TriClamp connections, about 10–13,500 lbs/hour of product 30P may be produced.

In certain embodiments, the system 10 is configured to yield elongated product 30p that can be configured as a continuous length of product having a length of at least about 2 inches. In certain embodiments, the continuous length of product 30p can be at least about 1 foot. In certain embodiments, the length may be about 20–25 feet. In other embodiments, the length of a continuous product may be up to about 50 feet, or even longer (which may be subsequently divided into desired lengths). The product may be cut into desired sizes as it is held in the tube (with the tube formed with cutting apertures), as it leaves the tube, or downstream thereof.

Figure 8A:
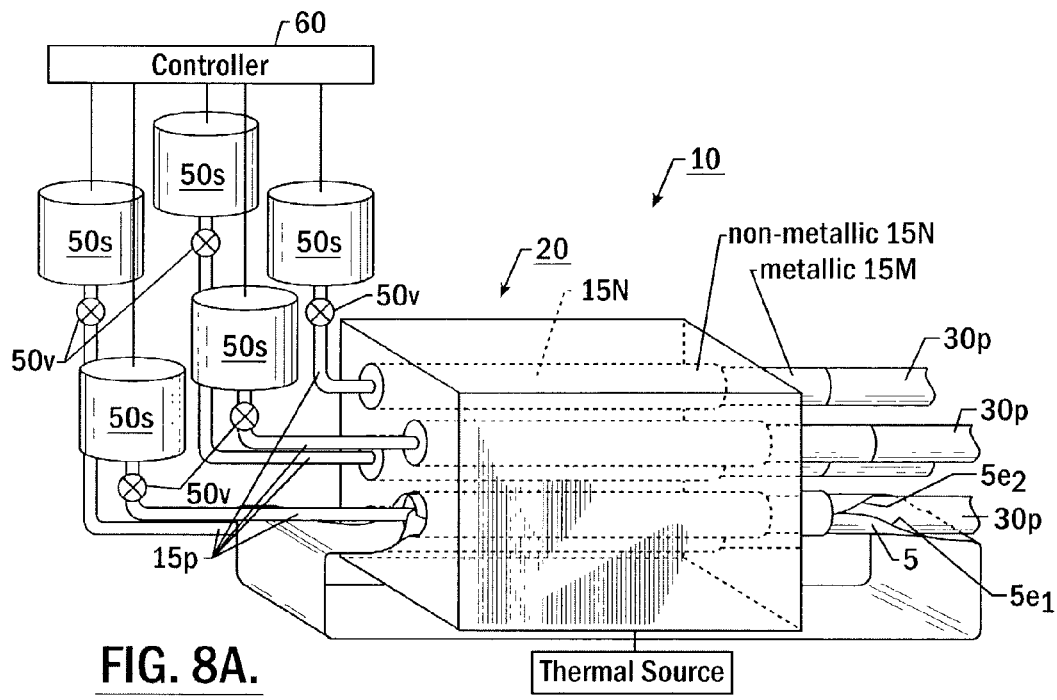
FIG. 8A is a schematic illustration of a processing system that includes a plurality of forming tubes in fluid communication with respective emulsion filled hoppers according to embodiments of the present invention.

FIG. 8A illustrates that each forming tube 15 may be in fluid communication with its own supply source 50s and associated valves 50v that control the flow rate of the emulsion that is pumped into the ingress portion of the respective forming tube 15. The wrappable member is not illustrated in FIG. 8C and only in a single line in FIG. 8A for clarity. The valves and pumps may be controlled by a common system controller 60 or separate controllers (not shown). FIG. 8A also illustrates that the tubes 15 may be configured with a non-metallic region 15N having a length $L_1$ that terminates into a region that is metallic and has a length $L_2$. The product 30p exits from the metallic portion after a suitable distance. Metallic lengths may be configured in advance of and into the thermal source in the processing region 20 as well. The conveyor forming the wrappable member 5 may be configured and sized to have its travel path held within the enclosure proximate each tube 15, or, as shown, to direct a portion of the belt to travel in its return via an externally located travel path.

Figure 8B:
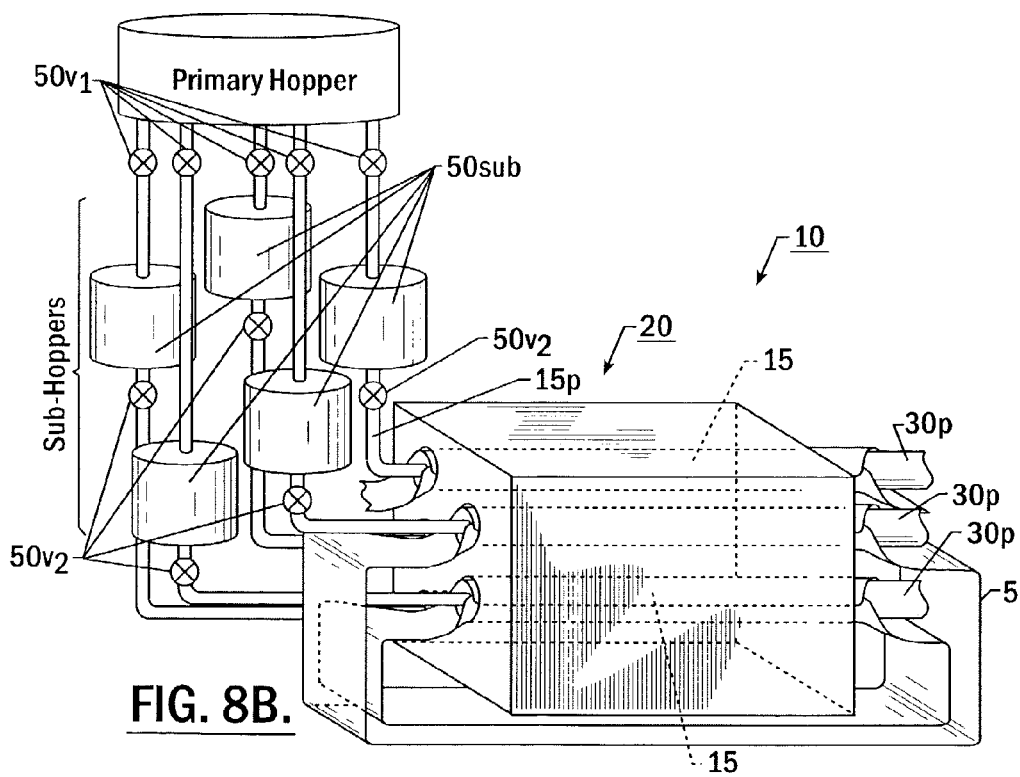
FIG. 8B is a schematic illustration of a processing system that includes a plurality of forming tubes and a plurality of sub-hoppers fed by a primary hopper according to alternative embodiments of the present invention.

FIG. 8B illustrates that the system 10 may include a primary hopper 50s that feeds a plurality of sub-hoppers 50sub, each associated with one or more of the forming tubes 15. Accordingly, the system may include associated primary and secondary valves $50v_1$, $50v_2$, respectively, along each path 15p. One or more pumps or flow sources can be disposed in the flow paths 15p as desired to provide the entry pressure and flow into the respective wrappable members 5 and/or tubes 15 (not shown). FIG. 8B also illustrates that the product 30p can be released from the wrappable member (such as shown as feature 5 in FIG. 2B) and discharged from the respective forming tube 15 at the exit of the enclosed processing region 20 (or prior to their exit therefrom). The wrappable members 5 may be nested as shown, with one extending a further vertical and horizontal distance than the other, or configured to be located symmetrically spaced and substantially constant in size line to line, about a respective forming tube 15 (not shown).

Figure 8C:
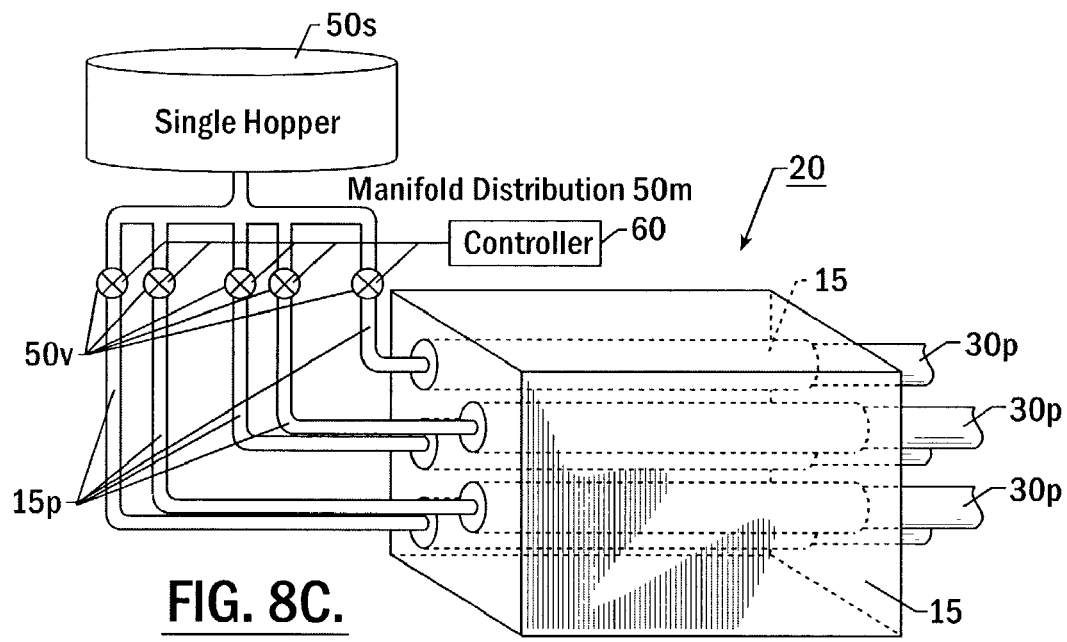
FIG. 8C is a schematic illustration of a processing system that includes a plurality of forming tubes and a primary hopper and distribution manifold according to alternative embodiments of the present invention.

FIG. 8C illustrates that the supply source 50s for a plurality of forming tubes 15 can be a primary hopper. As such, a distribution manifold 50m and associated valving 50v can be used to selectively direct the flow and emulsion quantities to the desired travel paths 15p and into the respective members 5 (FIG. 2B) and tubes 15. Again, the valves 50v and distribution in the manifold 50m can be controlled by a central controller 60. The valves can be remotely controlled and actuated (pneumatically, hydraulically, or electrically). The system 10 can include one or more pumps to provide the input pressure and flow rate of the emulsion into the ingress portion of the wrappable members proximate the respective tubes 15.

Figure 11A:
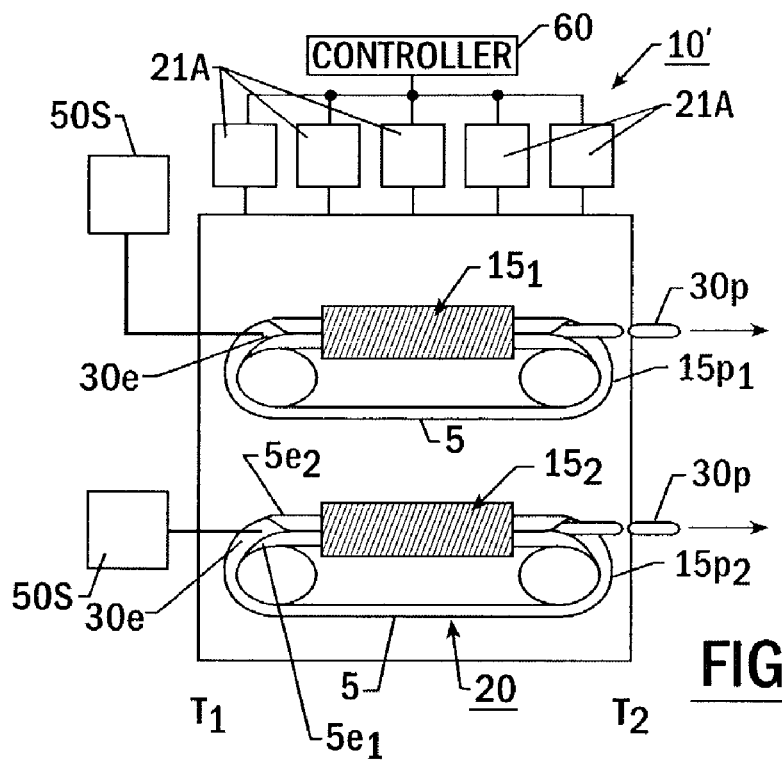
FIG. 11A is a schematic illustration of a dual line processing system according to embodiments of the present invention.

As shown in FIG. 11A, the system 10' can include a plurality of separate traveling endless wrappable members 5, a respective one for each different production line. As before, they can be configured to travel through a common processing region 20. Thus, each production line can include a respective endless wrappable member 5 and forming tube 15 with associated travel paths 15p. As such, the mold shells 15m for each production line can be directed to travel through the processing region concurrently (using a processing region configured to surround a plurality of production lines, with a shared heating, holding and/or cooling region). Each line may be operated to yield the same product in the same or different shapes or sizes, or different products. The system 10' may include a central controller 60 that directs the operation of a plurality of different energy sources. The controller 60 can adjust the energy generated depending on the type of product traveling in the processing region (such as the size of the forming tube 15 (volume), the type of emulsion mixture in the forming tube 15, the rate of speed of the wrappable member 5, and the like). The energy sources 21a may be of the same type and operated to maintain a homogenous or constant energy or temperature region in the processing region. Alternatively, selected ones of the energy sources 21a may be operated to produce local "hot" or "cold" spots or a graduated heating or cooling treatment zones as desired. FIG. 11A also illustrates that the temperature of the product can be raised from a first starting temperature $T_1$ to a second cooked temperature, $T_2$ that is at least about double the starting temperature measured in degrees Fahrenheit. The food emulsion may start at a temperature of about 50 degrees Fahrenheit and be processed to reach a temperature of about 158 degrees Fahrenheit.

Figure 11B:
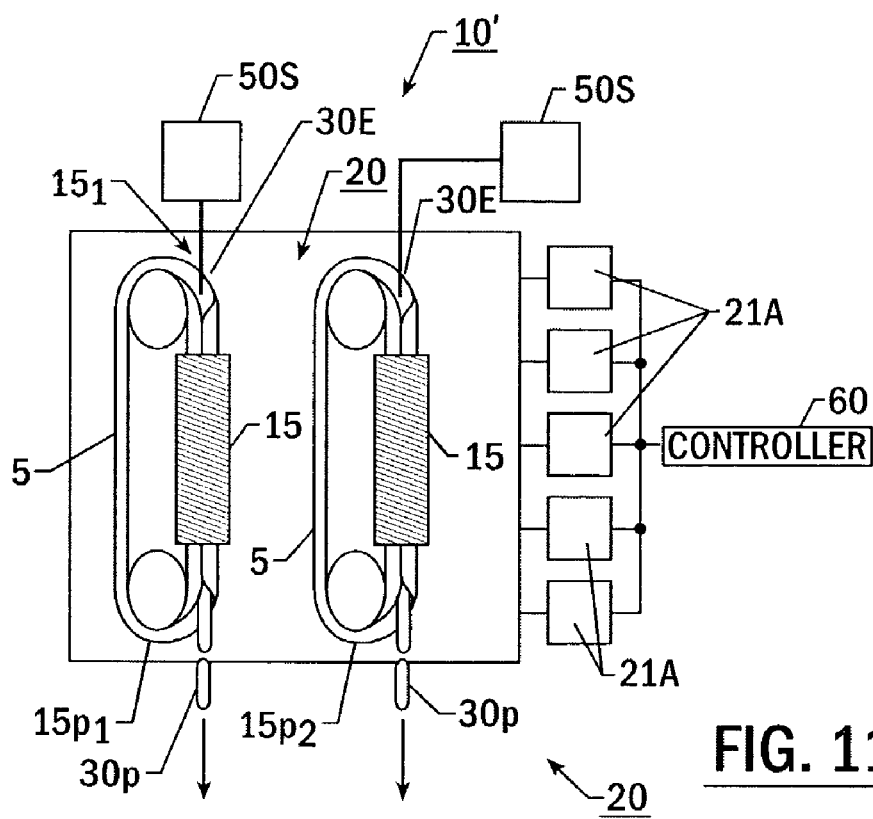
FIG. 11B is a schematic illustration of an alternate dual line processing system.

FIG. 11A illustrates that the lines may be oriented one above the other and directed to flow in a substantially horizontal throughput configuration, with the wrappable members 5 moving in horizontal forward and rearward directions for a major portion of the length of the travel path $15p_1$, $15p_2$. FIG. 11B illustrates an alternative example of two lines used to move the product through the processing region. FIG. 11B illustrates that the lines may be configured in side-by-side alignment and oriented to move in a vertical throughput configuration, with the wrappable members 5 traveling in a vertically upward or downward direction for a major portion of the length of the travel path $15p_1$, $15p_2$.

The systems 10 may be configured to cook, freeze, smoke, cure, pickle, partially dehydrate, or otherwise process the food as it moves through the processing region(s) 20.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for producing food products, comprising:
   moving at least one flexible cover member having a predetermined length with primary surface and opposing lateral edge portions along a predetermined travel path;
   introducing a flowable food emulsion onto the primary surface of the flexible cover member;
   wrapping the at least one flexible cover member about the food emulsion during the moving step;
   advancing the wrapped emulsion into at least one forming tube having sufficient structural rigidity to be substantially non-deformable and having a preformed internal cavity space of predetermined size and shape; and
   exposing the wrapped emulsion to predetermined processing conditions that convert the flowable emulsion to a non-flowable food product having substantially the molded shape of the forming tube as the wrapped emulsion advances through the at least one forming tube.

2. A method according to claim 1, further comprising releasing the non-flowable food product from the cover member after it exits the at least one forming tube.

3. A method according to claim 1, wherein the predetermined travel path is an endless travel path.

4. A method according to claim 3, wherein the cover member is substantially continuously moved along the endless travel path.

5. A method according to claim 1, wherein the at least one flexible cover member is a single cover member having a width that is sufficient to define a perimeter with the opposing lateral edges positioned proximate to each other and an internal cavity gap space.

6. A method according to claim 5, wherein the flexible member has a substantially planar configuration during a major portion of the predetermined travel path, and wherein the step of wrapping comprises moving the opposing lateral edge portions upward and inward so that the lateral edge portions reside proximate to each other to cause the flexible member to take on a substantially cylindrical shape.

7. A method according to claim 1, wherein the at least one flexible cover member has a primary surface that has a pre-formed concave configuration.

8. A method according to claim 1, wherein the at least one flexible cover member is a plurality of cover members that move in concert and meet proximate the forming tube to define a perimeter with an associated internal cavity gap space, and wherein the step of wrapping comprises directing the plurality of cover members to meet to define a perimeter with opposing lateral edges of each cover member disposed proximate to the opposing lateral edge of an adjacent cover member.

9. A method according to claim 8, wherein the flexible cover members define a first perimeter shape that is spaced apart from the forming tube, and wherein the step of introducing the emulsion forces the flexible members outwardly to contact and take the shape of the forming tube.

10. A method according to claim 1, wherein the wrapping step comprises directing the opposing lateral edges to travel toward each other to define an encased cavity at a first location and then automatically separate at a second downstream location to release the non-flowable food product.

11. A method according to claim 1, wherein the step of moving comprises moving the wrapped emulsion in a substantially vertical orientation along at least a portion of the predetermined travel path.

12. A method according to claim 1, wherein the step of moving comprises moving the wrapped emulsion in a substantially horizontal orientation along at least a portion of the predetermined travel path.

13. A method according to claim 1, wherein the step of introducing the emulsion is carried out with sufficient pressure to transfer surface indicia positioned on the primary surface of the cover member onto the exterior of the food product as the emulsion is moved along a portion of the predetermined travel path during the advancing step.

14. A method according to claim 13, wherein the surface indicia comprises alphanumeric indicia.

15. A method according to claim 13, wherein the surface indicia comprises a logo.

16. A method according to claim 1, wherein the forming tube is configured so that the product is formed with a non-circular cross-sectional profile.

17. A method according to claim 1, wherein the exposing step comprises heating the emulsion for predetermined times and temperatures as the wrapped emulsion travels in the forming tube along a portion of the predetermined travel path.

18. A method according to claim 17, wherein the heating step is carried out to raise the internal temperature of the wrapped emulsion to at least about 150 degrees F.

19. A method according to claim 1, wherein the exposing step comprises cooling the emulsion for predetermined times and temperatures as the emulsion travels along a portion of the predetermined travel path.

20. A method according to claim 1, wherein the exposing step comprises directing microwave energy at the wrapped emulsion for predetermined times and energy levels as the emulsion travels in the forming tube along a portion of the predetermined travel path.

21. A method according to claim 1, wherein the exposing step comprises directing RF energy at the wrapped emulsion for predetermined times and energy levels as the emulsion travels along a portion of the predetermined travel path.

22. A method according to claim 1, wherein the introducing step is carried out to at a sufficient pressure to cause the emulsion to substantially fill the volume of the forming tube.

23. A method according to claim 1, wherein the introducing step introduces a flowable meat based emulsion having an associated viscosity.

24. A method according to claim 1, wherein the emulsion of the introducing step comprises at least one type of meat.

25. A method according to claim 24, wherein the emulsion of the introducing step comprises at least one of pork, beef, lamb, veal, and poultry and/or analogs or derivatives thereof.

26. A method according to claim 24, wherein the emulsion of the introducing step comprises ground pork, ground beef and ground veal and/or selected ones or combinations of analogs or derivatives thereof.

27. A method according to claim 1, wherein the non-flowable edible food product comprises hot dogs.

28. A method according to claim 1, wherein the non-flowable edible food product comprises sausages.

29. A method according to claim 1, further comprising introducing a simulated skin onto the outer surface of the emulsion during said exposing step.

* * * * *